United States Patent [19]

Fyfe et al.

[11] Patent Number: 5,014,474
[45] Date of Patent: May 14, 1991

[54] SYSTEM AND APPARATUS FOR LIMITING THE EFFECT OF VIBRATIONS BETWEEN A STRUCTURE AND ITS FOUNDATION

[76] Inventors: Edward R. Fyfe, 1341 Ocean Ave., Del Mar, Calif. 92014; James M. Kelly, 126 The Uplands, Berkeley, Calif. 94705

[21] Appl. No.: 342,351

[22] Filed: Apr. 24, 1989

[51] Int. Cl.$^5$ .............................................. E04B 1/98
[52] U.S. Cl. ...................................... 52/167; 14/16.1; 248/634
[58] Field of Search .................. 52/167, 393, 573; 14/16.1; 248/634, 635

[56] References Cited

U.S. PATENT DOCUMENTS

| | | | |
|---|---|---|---|
| 1,574,985 | 3/1926 | McWain . | |
| 2,055,000 | 9/1936 | Bacigalupo | 72/77 |
| 2,705,928 | 4/1955 | Pont | 108/1 |
| 2,833,499 | 5/1958 | Lysedahl | 248/22 |
| 3,245,646 | 4/1966 | Baratoff | 248/358 |
| 3,289,998 | 12/1966 | Baratoff | 248/358 |
| 3,371,899 | 3/1968 | Johnson | 248/119 |
| 3,604,306 | 9/1971 | Denholm | 85/50 |
| 3,748,800 | 7/1973 | Glicksberg | 52/167 |
| 3,806,975 | 4/1974 | Fyfe | 14/16 |
| 3,856,242 | 12/1974 | Cook | 248/20 |
| 3,906,689 | 9/1975 | Nakayama | 52/167 |
| 3,921,240 | 11/1975 | Fyfe | 14/16 |
| 4,033,005 | 7/1977 | Czernik et al. | 14/16.1 |
| 4,121,393 | 10/1978 | Renault et al. | 52/167 |
| 4,166,344 | 9/1979 | Ikonomou | 52/167 |
| 4,187,573 | 2/1980 | Fyfe et al. | 14/16.1 |
| 4,209,868 | 7/1980 | Tada et al. | 14/16.1 |
| 4,499,694 | 2/1985 | Buckle et al. | 52/167 |
| 4,514,942 | 5/1985 | Pocanschi | 52/167 |
| 4,527,365 | 7/1985 | Yoshizawa et al. | 52/67 |
| 4,533,109 | 8/1985 | Delam | 248/542 |
| 4,633,628 | 1/1987 | Mustaghel | 52/167 R |
| 4,638,609 | 1/1987 | Csak | 52/167 |
| 4,713,917 | 12/1987 | Buckle et al. | 52/167 R |
| 4,718,206 | 1/1988 | Fyfe | 52/167 |

FOREIGN PATENT DOCUMENTS

| | | | |
|---|---|---|---|
| 0206183 | 12/1986 | European Pat. Off. | 52/167 |
| 2628276 | 12/1977 | Fed. Rep. of Germany | 52/167 |
| 3213031 | 7/1983 | Fed. Rep. of Germany | 52/167 |
| 1513555 | 2/1968 | France | 52/167 |
| 2254974 | 9/1975 | France | 52/167 |
| 1014338 | 1/1986 | Japan | 52/167 |
| 0111027 | 5/1987 | Japan | 52/167 |
| 0141330 | 6/1987 | Japan | 52/167 |
| 672578 | 5/1952 | United Kingdom . | |
| 969398 | 9/1964 | United Kingdom . | |

OTHER PUBLICATIONS

Japanese Poster on Base Isolation System.

Primary Examiner—David A. Scherbel
Assistant Examiner—Creighton Smith
Attorney, Agent, or Firm—Jack M. Wiseman

[57] ABSTRACT

Apparatus for limiting the effect of vibrations between a structure and its foundation having two types of elastomeric load bearing pads. One pad has the capability of absorbing vertically and horizontally applied forces. The other pad has the capability of accommodating sliding motion between the structure and the foundation and additionally to absorb horizontally applied forces. The apparatus includes restraining means for limiting horizontal and vertical displacement of the structure with respect to the foundation for reducing failure of the elastomeric load bearing pads resulting from deformation caused by the applied forces.

27 Claims, 4 Drawing Sheets

SYSTEM AND APPARATUS FOR LIMITING THE EFFECT OF VIBRATIONS BETWEEN A STRUCTURE AND ITS FOUNDATION

BACKGROUND OF THE INVENTION

The present invention relates in general to energy absorbers to reduce the influence of externally induced motion on structures, and more particularly to a load bearing assembly for mounting between a foundation and a structure to protect the structure from undesirable effects associated with an earthquake.

The earthquake phenomenon presents kinetic energy in a low frequency oscillatory mode. The part of the earth's surface directly above the focus of an earthquake is referred to as an epicenter. Kinetic energy resulting from an earthquake travels outward from the epicenter, effecting movement of the ground in its path. For purposes of analysis, the kinetic energy may be considered as being comprised of horizontal and vertical components. In practice, the horizontal components are typically of a greater magnitude than the vertical components.

Building constructions have the foundations thereof rigidly fixed to the ground. As a consequence thereof, energy present in an earthquake is transmitted to the building foundation, and, hence, to the building itself, resulting in structural failure. Foundations have been employed to limit the magnitude of the force transmitted to a building during earthquakes.

In U.S. Pat. No. 3,748,800, issued on July 31, 1973, to Raymond C. Glicksberg, for Earthquake-Insulation Foundations, there is disclosed a watertight building-base located within a water filled pool excavated in the earth, having sides and a bottom which are flexibly reinforced. The base of the building is centrally positioned within the pool by means of centering springs which provide a return force between the sides of the pool excavation and the sides of the base. Also disclosed in U.S. Pat. No. 3,748,800 is a flat bottomed building-base that rests on a surface of a pit of sand or other dry granular material.

In U.S. Pat. No. 3,906,689, issued on Sept. 23, 1975, to Tadayoshi Nakayama, for Apparatus For Absorbing Or Damping Vibrations Of The Ground, there is disclosed an apparatus for absorbing or damping vibrations of the ground caused by earthquakes and the like before the vibrations are transmitted to a building. The apparatus comprises a main vibration absorbing assembly and an auxiliary load carrying assembly, which are individually disposed between a groundsill of the building and the foundation of the building. The main vibration absorbing assembly comprises a group of springs mounted on a plate, with the axes thereof being inclined upwardly and inwardly so as to converge at an intersecting point where they are pivotally connected for tilting movement in every direction. The auxiliary load carrying assembly comprises a frame mounted under groundsills in positions directly under struts of a building, and an associated ball supported at the lower end of the load carrying assembly, in rolling engagement with the foundation.

U.S. Pat. No. 4,166,344, issued on Sept. 4, 1979, to Aristarchos S. Ikonomou, for Earthquake Guarding System, discloses a support and connecting means. The support provides elastic resistance to the movement of an associated structure and the connecting means provides a frangible link between the structure and the ground, breaking when the forces associated with an earthquake exceed a predetermined strength.

U.S. Pat. No. 4,533,109, issued on Aug. 6, 1985, to Heinz Delam, for Elastic Support Unit, discloses the use of an elastic support unit having a supporting element. The supporting element includes an elastic part and a sliding part. The elastic part is first elastically deformed under the action of a load and the supporting element acts within a first region. Then, the sliding part allows the supporting element to slide over a slide path and the supporting element acts within a second region. Thereafter, the supporting element upon passing the sliding region uses its stress reserve and after exceeding the stress reserve deforms the elastic part and thereby acts in a third region.

U.S. Pat. No. 4,121,393 issued on Oct. 24, 1978 to Jean Renault, et al., for Device For Protecting A Structure Against The Effects of High Horizontal Dynamic Stresses, discloses a system of friction supports comprised of seating blocks applied against each other and incorporated respectively with a structure and a foundation. Relative displacement is permitted employing friction of the associated seating blocks along their mutual bearing interface.

U.S. Pat. No. 4,527,365, issued on July 9, 1985, to Toshikazu Yoshizawa, et al., for Earthquake Insulating Bearing Assembly, discloses a first and second friction member employed in an elastic bearing assembly. Corrective action with respect to the bearing assembly subsequent to an earthquake is employed with respect to the second friction member. Also disclosed as prior art in this patent are several types of elastomeric bearings including metal sheets interspersed between layers or sheets of an elastic material. U.S. Pat. No. 4,499,694, issued on Feb. 19, 1985 to Ian G. Buckle, et al., for Cyclic Shear Energy Absorber, discloses a cyclic shear energy absorber to absorb energy induced by motion between members by plastic cyclical deformation of a central energy absorber core. The core is surrounded by a restraining element having movable inner walls. The restraining element is confined to a cylindrical aperture formed in a resilient support. The resilient support has alternate layers of a resilient material and stiffener plates. The resilient support functions as a bearing pad for transferring vertical loads through the device.

U.S. Pat. No. 4,187,573, issued on Feb. 12, 1980, to Edward R. Fyfe, et al., for High Load Bearing For Bridges And Similar Structures, discloses an elastomer pad having a concave periphery and means which mechanically abut the elastomer pad to limit lateral movement on the upper and lower surfaces of the elastomer pad. U.S. Pat. No. 4,514,942, issued on May 7, 1985, to Adrian Pocanschi, for Damping Installation For Earthquake-endangered Buildings, discloses a vibration insulator between a foundation and a building.

U.S. Pat. No. 3,921,240, issued on Nov. 25, 1975 to Edward R. Fyfe for Structural Bearings discloses a stuctural bearing, such as employed in bridges and large buildings, comprising a relatively thin layer of an elastomer interposed between and bonded to two flat bearing members, with at least one shear-resisting member extending between the two flat bearing members and being in shear-resisting pivotal engagement with one of them so as to accommodate vertical compression of the elastomer and tilting of the two flat bearing members. The structural bearings disclosed in this patent for use in bridges and high buildings also have features enabling them to accommodate sliding movement between the foundation and the structure supported by it.

U.S. Pat. No. 4,718,206, issued on Jan. 12, 1988, to Edward R. Fyfe, et al., for Apparatus For Limiting The Effect Of Vibrations Between A Structure And Its Foundation, discloses an elastomeric bearing pad and a hollow member disposed between the structure and its foundation. A cable or tensioning device, anchored at one end to the foundation, is centrally disposed within the elastomeric bearing, extending into the hollow chamber, and has a stop on the free end within the hollow chamber. The stop serves to limit horizontal and vertical movement of the elastomeric bearing.

SUMMARY OF THE INVENTION

Briefly described, an apparatus for limiting vibrational effects between a structure and its foundation comprising a load bearing elastomeric element disposed between and connected to the structure and the foundation. The load bearing elastomeric element has the capability of absorbing vertically and horizontally applied forces. Additionally, the load bearing elastomeric element also has the capability of accommodating sliding motion between the structure and the foundation.

An apparatus for limiting vibrational effects between a structure and its foundation comprising a load bearing elastomeric element disposed between and connected to the structure and the foundation. The load bearing elastomeric element has the capability of absorbing vertically and horizontally applied forces. Restraining means are employed for limiting horizontal displacement between the structure and its foundation. The restraining means has a lower end connected to the foundation and an upper end connected to the structure.

The present invention comprises an apparatus for limiting the effects of vibration between a structure and its foundation comprising an upper bearing plate member secured to the underside of the structure. A lower bearing plate member is secured to the upperside of the foundation. An elastomeric load bearing element is disposed between the upper and lower plate members. The elastomeric load bearing element provides a damping and restoring force to the structure and exerts an influence on lateral displacement, uplift, and accommodates a sliding motion between the structure and its foundation. Restraining means are provided for limiting horizontal displacement of the upper and lower load bearing plate members. The restraining means has an upper end connected to the upper bearing plate member and a lower end connected to the lower bearing plate member.

A feature of the present invention is a reduction of overall height for the apparatus employed to limit the effects of vibration between a structure and its foundation and also a savings in costs to manufacture apparatus employed to limit the effects of vibration between a structure and its foundation.

Another feature of the present invention is to provide apparatus for limiting vibrations between a structure and its foundation that has an enclosed housing to protect sliding elements and load bearing elements from foreign matter that tends to reduce the effectiveness and useful duration of the sliding elements and load bearing elements.

Another feature of the present invention is the employment of chambers, sleeves, tubes or the like for protecting the restraining means from foreign matter that tends to reduce the effectiveness and useful duration of the restraining means.

DESCRIPTION OF THE PREFERRED EMBODIMENTS

Illustrated in FIGS. 1–4 is an apparatus 10 embodying the present invention, which is interposed between a building structure 11 and its foundation 12 for supporting the building structure 11 and for limiting the effect of vibrations between the building structure 11 and its foundation 12. While reference herein is made to a building structure, it is apparent that other forms of structures are equally applicable, such as bridges, military tanks or other structures subject to seismic vibrations or the like. The apparatus 10 comprises a rigid upper bearing plate 15, which is fixedly secured to a bottom wall of the building structure 11 by anchor bolts 16. In the exemplary embodiment, the upper bearing plate 15 is made of steel. A rigid lower bearing plate 17 is fixedly secured to a top wall of the foundation 12 by suitable means, such as anchor bolts 18. The lower bearing plate 17, in the exemplary embodiment, is made of steel. The anchor bolts 16 and 18 may be of the type known as Nelson studs.

Disposed between the upper bearing plate 15 and the lower bearing plate 17 is an elastomeric load bearing element 20. The load bearing element 20 has the capability of limiting or damping horizontal and vertical forces, and, thus, limit horizontal and vertical displacement or movement between the structure 11 and its foundation 12. In addition thereto, the load bearing element 20 has the capability of permitting sliding movement between the upper bearing plate 15 and the lower bearing plate 17. Hence, the elastomeric load bearing element 20 accommodates sliding movement between the structure 11 and its foundation 12. In the preferred embodiment, the apparatus 10 includes restraining means, such as a chain 21, that is secured by suitable means, such as welding, to the upper bearing plate 15 and the lower bearing plate 17.

The elastomeric load bearing element 20, in the preferred embodiment, comprises a stack of vertically spaced shims 25. In the exemplary embodiment, the shims 25 are made of steel. Disposed between successive shims is a layer of rubber or elastomeric load bearing pads 28. In the preferred embodiment, the elastomeric load bearing pads 28 are made of neoprene or polyurethane. Surrounding the shims 25 and the layers of elastomeric pads 28 are upright elastomeric or rubber outer walls 30 of the load bearing element 20. The walls 30 are rectangular in cross-sectional area and in cooperation with the bearing plates 15 and 17 form a housing or an enclosure for the load bearing element 20 to prevent foreign matter from entering into the load bearing element 20. Foreign matter entering the load bearing element 20 tends to reduce the effectiveness or useful duration of the load bearing element 20. An upright cylindrical inner rubber or elastomeric wall 31 of the load bearing element 20 is disposed centrally within the elastomeric load bearing element 20. The wall 31 defines an enclosure or chamber for the chain or restraining means 21 to prevent the chain 21 from being exposed to foreign matter. Foreign matter, when exposed to the restraining means, tends to reduce the effectiveness or useful duration of the restraining means.

The elastomeric load bearing pads 28 and the shims 25, which are respectively disposed between successive elastomeric load bearing pads 28, serve to absorb vertically and horizontally applied forces. In this manner, there is a damping and restoring force applied to the structure 11 when there is a vibratory action between the foundation 12 and the structure 11. As a result thereof, the elastomeric load bearing pads 28 and the shims 25 limit horizontal and vertical displacement between the structure 11 and its foundation 12.

Located between the uppermost elastomeric pad 28 and the upper bearing plate 15 is an upper support plate 32 of the load bearing element 20 that engages the walls 30 along its perimeter. The sides of the upper support plate 32 conform to the configuration of the walls 30. The plate 32 is made of suitable material, such as steel. A bore 33 and a reduced diameter bore 34 are formed centrally within the upper support plate 32. The bores 33 and 34 form a recessed area and a shoulder on which an elastomeric or rubber disc 40 is seated. In the exemplary embodiment, the elastomeric pad 40 is a low friction plastic material, such as plastic material sold by DuPont under the Trademark TEFLON. The suitable plastic material, in the exemplary embodiment, is polytetrafluoroethylene (PTFE). The elastomeric disc 40 accommodates sliding motion between the structure 11 and its foundation 12 by enabling a horizontal displacement therebetween of greater magnitude than is accommodated by the elastomeric pads 28.

A lower support plate 35 of the load bearing element 20 is disposed between the lowermost elastomeric pad 28 and the lower bearing plate 17. The lower support plate 35 is made of suitable material, such as steel. Formed in the lower support plate 35 are a bore 36 and a reduced diameter bore 37. Seated on the lower bearing plate 17 and locked within the recess formed by the bores 36 and 37 is a disc 41 of the load bearing element 20. The disc 41 is made of suitable material, such as steel.

The upper link of the chain 21 passes through suitable openings formed in the elastomeric disc 40 and is welded to the underside of the upper bearing plate 15. The lower link of the chain 21 passes through suitable openings formed in the steel disc 41 and is welded to the upperside of the lower bearing plate 17. The chain 21 serves as restraining means in limiting the horizontal and vertical displacement between the structure 11 and its foundation 12. By limiting the extent of horizontal and vertical displacement between the structure 11 and its foundation 12, failure of the elastomeric load bearing pads 28 and the shims 25 is reduced during an earthquake.

For removably retaining the walls 30 in the enclosure state; for removably retaining the upper support plate 32 against the fixed upper bearing plate 15; and for removably retaining the lower support plate 35 against the fixed lower bearing plate 17, upper retaining bars 45 and lower retaining bars 46 are provided. The upper retaining bars 45 are disposed about the perimeter of the walls 30 contiguous with the lower surface of the upper bearing plate 15. Screws 47 removably secure the upper bars 45 to the upper bearing plate 15 and screws 48 removably secure the upper support plate 32 to the upper bars 45. Similarly, the lower bars 46 are disposed about the perimeter of the walls 30 contiguous with the upper surface of the lower bearing plate 177. Screws 50 removably secure the lower bars 46 against the fixed lower bars 46 to the lower bearing plate 17 and screws 51 removably secure the lower support plate 35 to the lower bars 46.

The housing formed by the walls 30 and the load bearing plates 15 and 17 through the guide bars 45 and 46 and the screws 47, 48, 50 and 51 permit access to the elastomeric load bearing element 20. If access to the load bearing element 20 is desired, a jacking system is set in place to support the structure 11, the screws 47, 48, 50 and 51 are removed, followed by the guide bars 45 and 46, and followed by removal of a link in the chain 21. The elastomeric load bearing element 20 is inspected, removed, and replaced, if necessary.

During an earthquake, the foundation 12 and the lower extremity of the load bearing element 20 moves generally horizontally (FIG. 3) with a slight vertical uplift. The elastomeric load bearing pads 28 absorb horizontally and vertically applied forces through the inelastic deformation of the elastomeric load bearing pads 28, thereby protecting the structure 11 from damage caused by an earthquake.

As the elastomeric load bearing pads 28 deform in a horizontal and vertical direction, the chain or restraining device 21 will be extended within the cylindrical wall 31. The extent of the deformation of the elastomeric load bearing pads 28 will be limited by the chain or restraining device 21.

In addition to limiting horizontal deformation of the elastomeric load bearing pads 28, the operation of the chain or restraining device 21 also limits vertical deformation, thereby preventing uplift failure of the elastomeric load bearing pads 28. The elastomeric load bearing pads 28 are active for all movements of the foundation 12. Thus, the elastomeric bearing pads 28 dampen vertical vibrating motions as well as horizontal vibrating motions.

Figure 1:
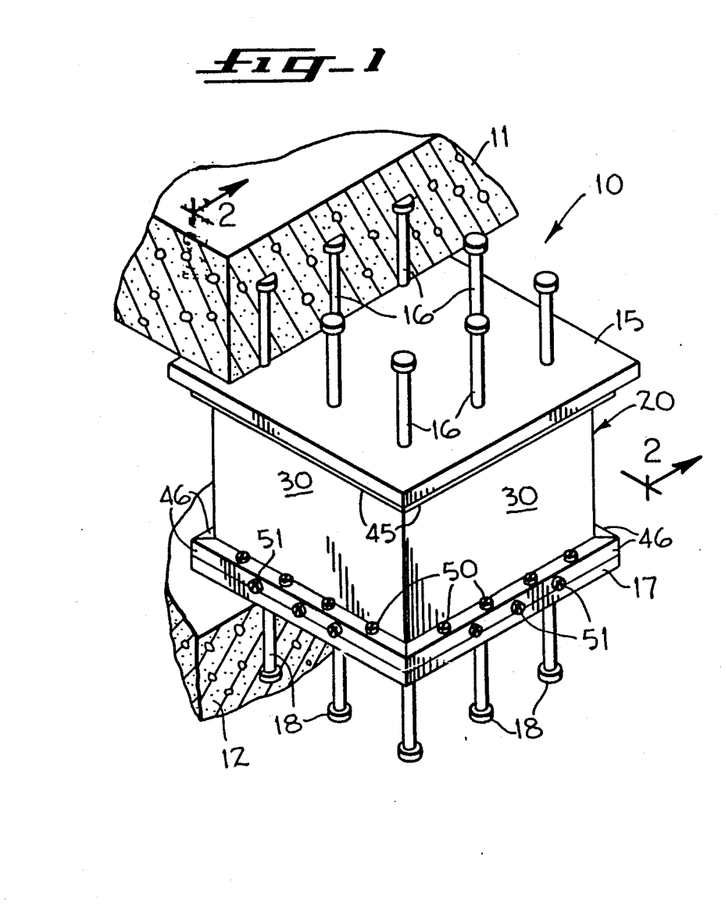
FIG. 1 is a perspective view of an apparatus for limiting the effect of vibrations between a structure and its foundation embodying the present invention and illustrated with a fragment of the structure and a fragment of the foundation.
Figure 2:
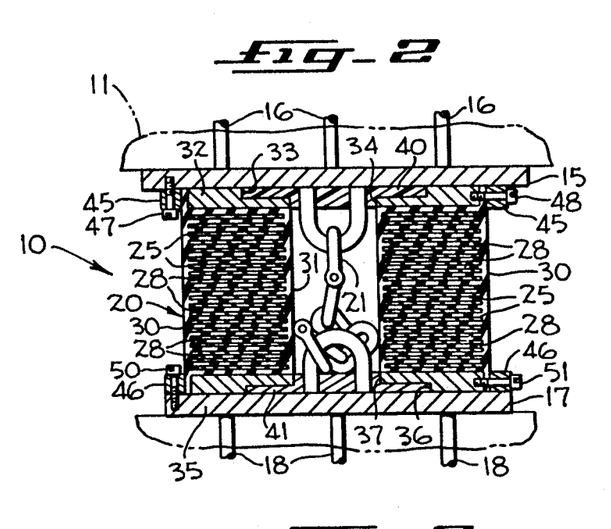
FIG. 2 is a fragmentary vertical sectional view, partially in elevation, of the apparatus shown in FIG. 1 taken along line 2—2 of FIG. 1 illustrating elastomeric load bearing elements and restraining devices employed in the apparatus in FIG. 1 for limiting the effect of vibrations between a structure and its foundation and illustrated with a fragment of the structure and a fragment of the foundation.
Figure 3:
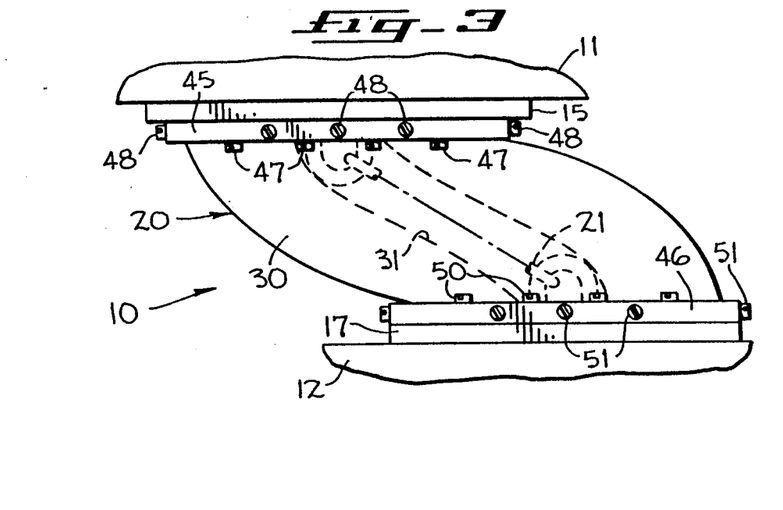
FIG. 3 is a diagrammatic elevation view of the apparatus shown in FIGS. 1 and 2 subsequent to horizontal displacement resulting from horizontal forces applied to the foundation and illustrated with a fragment of the structure and a fragment of its foundation.
Figures 4, 5, 6:
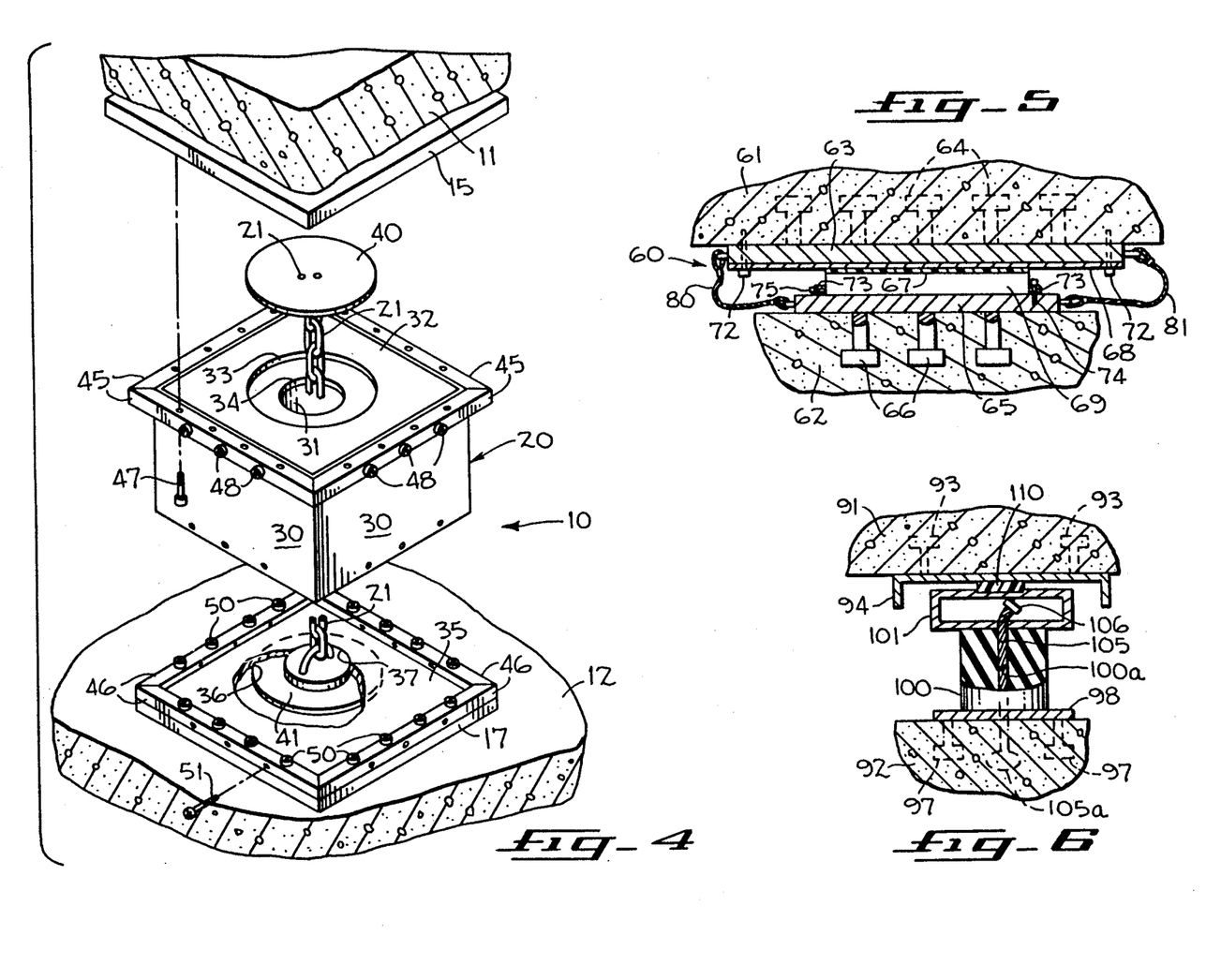
FIG. 4 is an exploded perspective view of the apparatus shown in FIGS. 1-3 and illustrated with a fragment of the structure and a fragment of its foundation.
FIG. 5 is a vertical sectional view, partially in elevation, of an apparatus for limiting the effect of vibrations between a structure and its foundation with a load bearing element capable of sliding movement and with restraining means located at each side of the load bearing element and illustrated with a fragment of the structure and a fragment of its foundation.
FIG. 6 is a vertical sectional view, partially in elevation, of an apparatus for limiting the effect of vibrations between a structure and its foundation employing load bearing elements and a cable for limiting horizontal displacement between the structure and its foundation and illustrated with a fragment of the structure and a fragment of its foundation.

Illustrated in FIG. 5 is an apparatus 60 for providing a sliding motion between a building structure 61 and its foundation 62. An upper load bearing plate 63 is secured to the structure 61 by suitable means, such as anchor bolts 64. The anchor bolts 64 may be in the form of Nelson studs. A lower load bearing plate 65 is secured to the foundation 62 by suitable means, such as anchor bolts 66, which may be in the form of Nelson studs.

A suitable layer 67 of low friction rubber or elastomeric material, such as Teflon, is sandwiched between an upper support plate 68 and a lower support block 69. The layer 67, in the exemplary embodiment, may be polytetrafluoroethylene (PTFE). In the exemplary embodiment, the support plate 68 is made of polished stainless steel and the support block 69, in the preferred embodiment, is made of suitable elastomeric material with steel reinforcing plates therein. In the alternative, the support block 69 may be a fiberglass plate. The elastomeric layer 67 may be etched to improve the bonding action with the block 69. The elastomeric layer 67 is caused to adhere to the confronting surfaces of the upper support plate 68 and the lower support block 69 by a suitable adhesive, such as Chemlock. The upper support plate 68 is secured to the contiguous upper load bearing plate by means of screws 72. The lower support block 69 is secured to the lower load bearing plate by guide bars 73 and screws 74 and 75.

The layer 67 of elastomeric material accommodates a relative sliding movement or horizontal displacement between the structure 61 and its foundation 62. For limiting the extent of the sliding movement or horizontal displacement between the structure 61 and its foundation 62, suitable restraining means, such as cables 80 and 81, are provided. The cables 80 and 81 are made of steel. One end of the cable 80 is attached to one side of the upper load bearing plate 63 and the other end of the cable 80 is attached to one side of the lower load bearing plate 65. The cable 81 is attached at one end thereof to the opposite side of the upper load bearing plate 63 and the other end of the cable 81 is attached to the opposite side of the lower load bearing plate 65.

Illustrated in FIG. 6 is an apparatus 90 that is interposed between a building structure 91 and its foundation 92 for supporting the building structure 91 and for limiting the effect of vibrations between the building structure 91 and its foundation 92. Fixedly secured to the structure 91 by suitable means, such as anchor bolts 93, is an upper load bearing plate 94. The upper load bearing plate 94 is made of suitable material, such as steel, and, in the exemplary embodiment, has an inverted U-shaped configuration in cross-section. Fixedly secured to the foundation 92 by suitable means, such as anchor bolts 97, is a lower load bearing plate 98. The lower load bearing plate 98 is made of suitable material, such as steel.

Disposed above the lower load bearing member 98 is a rubber or elastomeric load bearing element 100. In the preferred embodiment, the elastomeric load bearing element 100 is made of neoprene or polyurethane and has a cylindrical configuration. The bottom of the elastomeric load bearing element 100 is caused to adhere to the upper surface of the lower load bearing plate 98 by a suitable adhesive, such as Chemlock. The top of the elastomeric load bearing element 100 is caused to adhere to the lower surface of a hollow member 101 by a suitable adhesive, such as Chemlock.

The elastomeric load bearing element 100 serves to limit or dampen horizontal and vertical forces, and, thus, limits horizontal and vertical displacement or movement between the structure 91 and its foundation 92. An axial bore 100$a$ is formed in the cylindrically shaped elastomeric load bearing element 100. Freely disposed within the axial bore 100$a$ is a suitable restraining means, such as a cable 105, which is made of suitable material, such as steel. One end of the cable 105 is anchored or embedded in the foundation 92 by means of an anchor 105$a$. The other end of the cable 105 is formed with a stop 106. An opening is formed in the lower wall of the hollow member 101 to freely receive the cable 105. The stop 106 is disposed within the hollow member 101. The stop 106 prevents the free end of the cable 105 from passing through the opening in the hollow member 101.

As the elastomeric load bearing element 100 deforms in a horizontal direction, the cable 105 will move downwardly in response to the horizontal displacement within the hollow member 101. The extent of the horizontal displacement between the structure 91 and its foundation 92 and the extent of the vertical displacement between the structure 91 and its foundation 92 will be limited by the stop 106 abutting against the bottom wall of the hollow member 101. Thus, the cable 105 limits horizontal displacement between the structure 91 and its foundation 92 and also limits uplift or vertical displacement between the structure 91 and its foundation 92. The elastomeric load bearing element 100 is active for all movements of the foundation 92. Thus, the elastomeric load bearing element 100 dampens vertical vibrating motions as well as horizontal vibrating motions. By limiting the extent of the deflection or deformation of the elastomeric load bearing element 100, failure of the elastomeric load bearing element 100 during an earthquake is reduced.

Interposed between the channel member 101 and the load bearing plate 94 is a low friction rubber or elastomeric pad 110 made of suitable material, such as Teflon. The elastomeric pad 110, in the exemplary embodiment, is made of polytetrafluoroethylene (PTFE). The elastomeric pad 110 is caused to adhere to the bottom surface of the load bearing plate 94 and to the top surface of the channel member 101. The elastomeric pad 110 accommodates sliding motion between the structure 91 and its foundation 92 by enabling a horizontal displacement therebetween of greater magnitude than is accommodated by the load bearing elastomeric element 100.

Figure 7:
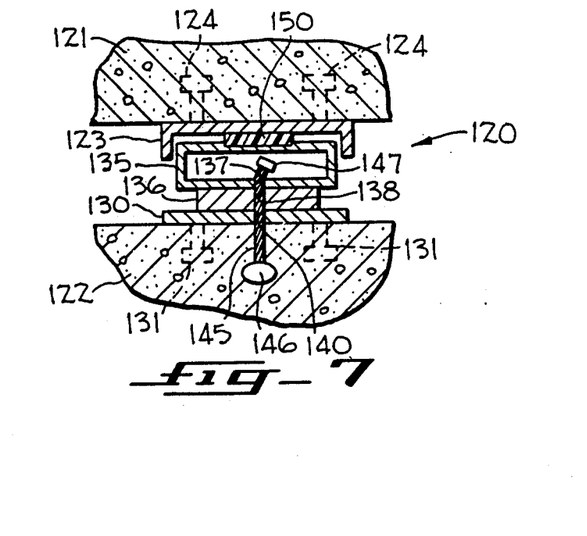
FIG. 7 is a vertical sectional view, partially in elevation, of an apparatus for limiting the effect of vibrations between a structure and its foundation with a load bearing element capable of sliding movement and a cable for limiting horizontal displacement between the structure and its foundation and illustrated with a fragment of the structure and a fragment of its foundation.

Illustrated in FIG. 7 is an apparatus 120 for limiting the effect of vibrations between a building structure 121 and its foundation 122. The apparatus 120 comprises an upper load bearing plate 123 secured to the structure 121 by means of suitable anchor bolts 124. In the exemplary embodiment, the load bearing plate 121 is made of steel and has an inverted U-shaped configuration. A lower load bearing plate 130 of the apparatus 120 is secured to the foundation 122 by means of suitable anchoring bolts 131. The lower load bearing plate 130, in the exemplary embodiment, is made of steel.

Disposed below and spaced from the upper load bearing plate 123 is a hollow member 135, which is made of suitable material, such as steel. Disposed between the hollow member 135 and the bottom load bearing plate 130 is a support block 136. The support block 136 is made of steel and is welded to the bottom of the hollow member 135 and to the top of the load bearing plate 130. Formed in the hollow member 135 and the support block 136, respectively, are vertically aligned openings 137 and 138. An opening 140 is formed in the lower load bearing plate 130, which is vertically aligned with the openings 137 and 138. Freely disposed within the openings 137-140 is restraining means or a cable 145. One end of the cable 145 is anchored or embedded in the foundation 122 through an anchor 146. The other end of the cable 145 includes a stop 147 which is disposed in the hollow member 135, which is greater in diameter than the opening 137 of the hollow member 135.

Interposed between the load bearing plate 123 and the hollow member 135 is a suitable low friction rubber or elastomeric pad 150. In the exemplary embodiment, the elastomeric pad 150 is made of Teflon. The elastomeric pad 150, in the exemplary embodiment, may be made of a polytetrafluoroethylene (PTFE). The elastomeric pad 150 is caused to adhere to the underside of the upper load bearing plate 123 and the upperside of the hollow member 135 by a suitable adhesive, such as Chemlock. The elastomeric pad 150 is etched to improve the bonding action with the load bearing plate 135 and the hollow member 135. The elastomeric pad 150 has the capability of accommodating sliding motion between the structure 121 and its foundation 122. Additionally, the elastomeric pad 150 absorbs horizontally applied forces. The cable 145 serves to limit the horizontal displacement between the structure 121 and its foundation 122. When the stop 146 engages the base of the hollow member 135, the cable or restraining device 145 will be drawn taut, thereby limiting further sliding motion between the structure 121 and its foundation 122 and also limit the extent of the deformation of the elastomeric pad 150. The failure of the elastomeric pad 150 is thereby reduced during excessive sliding motion. The cable 145 is enclosed by the hollow member 135, the support block 136, the load bearing plate 130 and the foundation 122 to prevent the cable 145 from being exposed to foreign matter.

Figure 8:
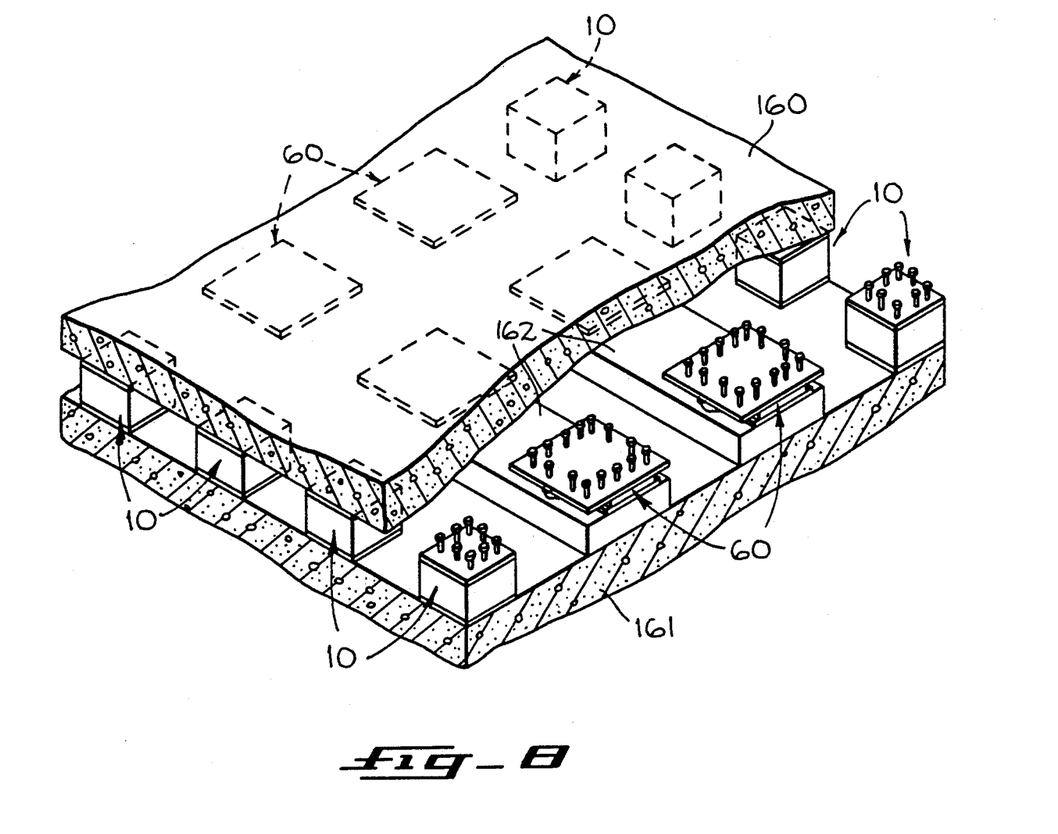
FIG. 8 is a perspective view of an assembly of apparatuses for limiting the effect of vibrations between a structure and its foundation and illustrated with a fragment of the building structure and a fragment of its foundation.

Illustrated in FIG. 8 is a building structure 160 and its foundation 161. Disposed between the building structure 160 and its foundation 161 are a plurality of load bearing apparatus 10 (FIGS. 1-4) and a plurality of load bearing apparatus 60 (FIG. 5). The load bearing apparatuses 10 have the capability of absorbing vertically and horizontally applied forces. The load bearing apparatuses 60 have the capability of accommodating sliding motion between the structure 160 and the foundation 161, and additionally to absorb horizontally applied forces. The apparatuses 60 are generally thinner than the apparatuses 10. Thus, the apparatuses 60 are supported by and secured to a plurality of elevated supports 162 by suitable means, not shown. The load bearing apparatuses 10 are aligned in rows. The load bearing apparatuses 60 are also aligned in rows. In the preferred embodiment, the load bearing apparatuses 10 form the outer rows, while the load bearing apparatuses 60 form the inner rows. The combining of high damping elastomeric load bearing elements for absorbing vertically and horizontally applied forces with low friction damping load bearing elements that absorb applied forces which cause sliding motions increases the effective viscous damping of the system, when compared to an all high damping elastomeric system. The greater the damping, the lesser the magnitude of horizontal displacement. The low friction damping load bearing elements are low over all heights for suitable retrofit. By virtue of the combining of a high damping elastomeric load bearing element and a low friction damping load bearing element, a more economical system is achieved. The low friction damping load bearing elements are more economical to use while reducing horizontal displacement. The low friction damping load bearing elements lend themselves to compactness because of the high load, high pressure, small deflection characteristics of the elastomers employed.

Figures 9, 10, 11:
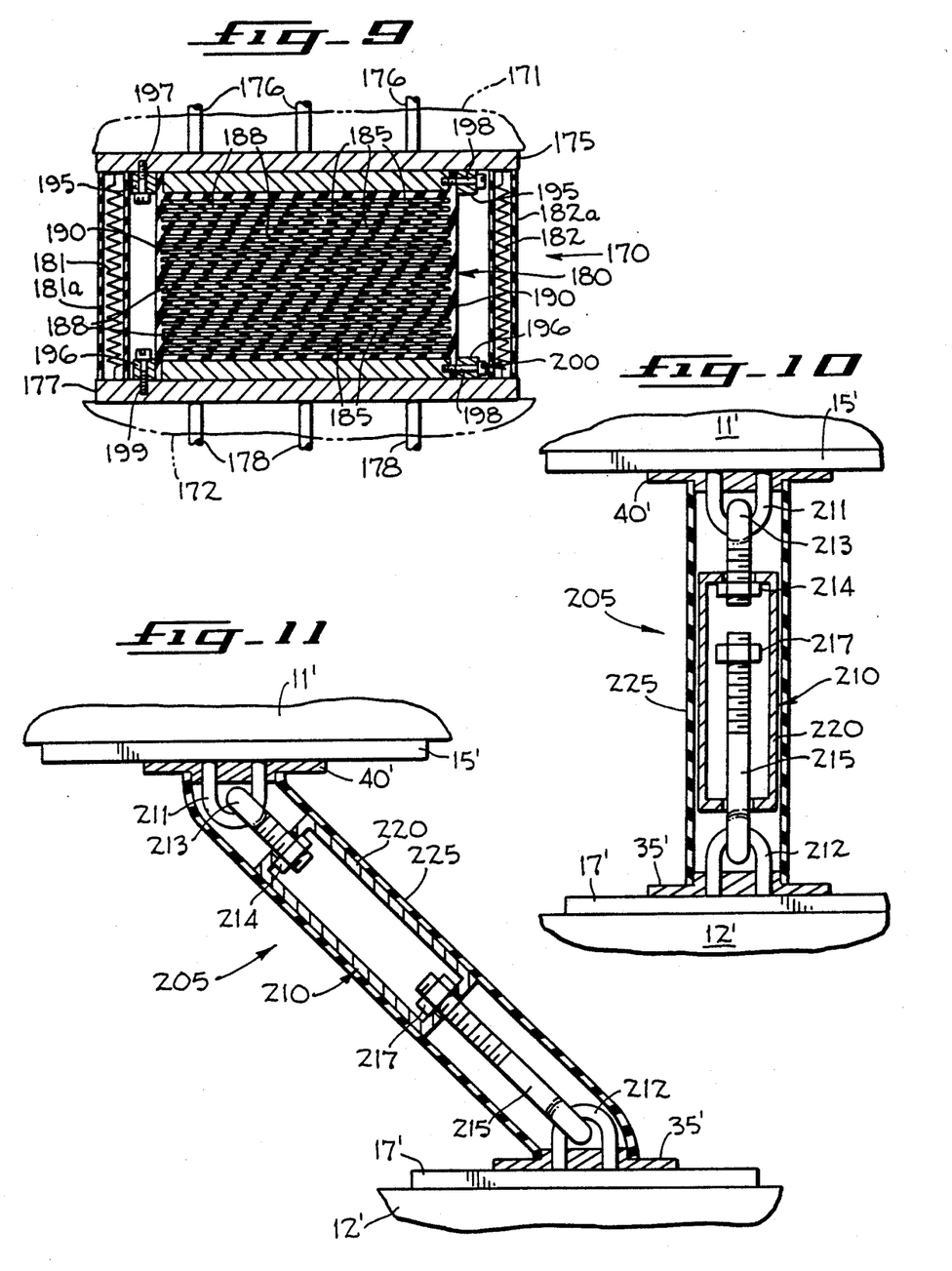
FIG. 9 is a fragmentary vertical sectional view, partially in elevation, of another apparatus illustrating an elastomeric load bearing element and restraining devices employed in the apparatus for limiting the effect of vibrations between a structure and its foundation and illustrated with a fragment of the structure and a fragment of the foundation.
FIG. 10 is a fragmentary vertical sectional view, partially in elevation, of another apparatus illustrating an elastomeric load bearing element and restraining devices employed in the apparatus for limiting the effect of vibrations between a structure and its foundation and illustrated with a fragment of the structure and a fragment of the foundation.
FIG. 11 is a diagrammatic elevation view of the apparatus shown in FIG. 10 subsequent to horizontal displacement resulting from horizontal forces applied to the foundation and illustrated with a fragment of the structure and a fragment of its foundation.

Illustrated in FIG. 9 is an apparatus 170, which is interposed between a building structure 171 and its foundation 172 for supporting the building structure 171 and for limiting the effect of vibrations between the building structure 171 and its foundation 172. The apparatus 170 comprises a rigid upper bearing plate 175, which is fixedly secured to a bottom wall of the building structure 171 by anchor bolts 176. In the exemplary embodiment, the upper bearing plate 175 is made of steel. A rigid lower bearing plate 177 is fixedly secured to a top wall of the foundation 172 by suitable means, such as anchor bolts 178. The lower bearing plate 177, in the exemplary embodiment, is made of steel. The anchor bolts 176 and 178 may be of the type known as Nelson studs.

Disposed between the upper bearing plate 175 and the lower bearing plate 177 is an elastomeric load bearing element 180. The load bearing element 180 has the capability of limiting or damping horizontal and vertical forces, and, thus, limit horizontal and vertical displacement or movement between the structure 171 and its foundation 172. In addition thereto, the load bearing element 180 has the capability of permitting sliding movement between the upper bearing plate 175 and the lower bearing plate 177. Hence, the elastomeric load bearing element 180 accommodates sliding movement between the structure 171 and its foundation 172. In the preferred embodiment, the apparatus 170 includes restraining means, such as coiled cables 181 and 182, that are secured by suitable means, such as welding, to the upper bearing plate 175 and the lower bearing plate 177. The cables 181 and 182, which in the exemplary embodiment are made of spring steel, are extendible and are self restoring to the initial coiled arrangement.

The elastomeric load bearing element 180, in the preferred embodiment, comprises a stack of vertically spaced shims 185. In the exemplary embodiment, the shims 185 are made of steel. Disposed between successive shims 185 is a layer of rubber or elastomeric load bearing pads 188. In the preferred embodiment, the elastomeric load bearing pads 188 are made of neoprene or polyurethane. Surrounding the shims 185 and the layers of elastomeric pads 188 are upright elastomeric or rubber outer walls 190 of the load bearing element 180. The walls 190 are rectangular in cross-sectional area and in cooperation with the bearing plates 175 and 177 form a housing or an enclosure for the load bearing element 180 to prevent foreign matter from entering into the load bearing element 180. Foreign matter entering the load bearing element 180 tends to reduce the effectiveness or useful duration of the load bearing element 180.

The elastomeric load bearing pads 188 and the shims 185, which are respectively disposed between successive elastomeric load bearing pads 188, serve to absorb vertically and horizontally applied forces. In this manner, there is a damping and restoring force applied to the structure 171 when there is a vibratory action between the foundation 172 and the structure 171. As a result thereof, the elastomeric load bearing pads 188 and the shims 185 limit horizontal and vertical displacement between the structure 171 and its foundation 172.

The upper ends of the cables 181 and 182 are, respectively, fixed to the underside of the upper bearing plate 175. The lower ends of the cables 181 and 182 are, respectively, secured to the upperside of the lower bearing plate 177. The cables 181 and 182 serve as restraining means in limiting the horizontal and vertical displacement between the structure 171 and its foundation 172. By limiting the extent of horizontal and vertical displacement between the structure 171 and its foundation 172, failure of the elastomeric load bearing pads 188 and the shims 185 is reduced during an earthquake. For maintaining the cables 181 and 182 free of foreign matter, suitable enclosures 181a and 182a, such as rubber or suitable elastomer sleeves or shields surround, respectively, the cables 181 and 182.

For removably retaining the four walls 190 (only two are shown) in the enclosure state and for removably retaining the end bearing element 180 between the upper bearing plate 175 and the lower bearing plate 177 along with the walls 190, upper retaining bars 195 and lower retaining bars 196 are provided. The upper retaining bars 195 are disposed about the perimeter of the walls 190 contiguous with the lower surface of the upper bearing plate 175. Screws 197 removably secure the upper bars 195 to the upper bearing plate 175 and screws 198 removably secure the upper bars 195 to the upper bearing plate 175. Similarly, the lower bars 196 are disposed about the perimeter of the walls 190 contiguous with the upper surface of the lower bearing plate 177. Screws 199 removably secure the lower bars 196 against the lower bearing plate 177 and screws 200 removably secure the lower bars 196 to the lower bearing plate 177.

The housing formed by the walls 190 and the load bearing plate 175 and 177 through the guide bars 195 and 196 and the screws 197, 198, 199 and 200 permit access to the elastomeric load bearing element 180. If access to the load bearing element 180 is desired, a jacking system is set in place to support the structure 171, the screws 197, 198, 199 and 200 are removed, and followed by the guide bars 195 and 196. The elastomeric load bearing element 180 is inspected, removed, and replaced, if necessary.

During an earthquake, the foundation 172 and the lower extremity of the load bearing element 180 moves generally horizontally with a slight vertical uplift. The elastomeric load bearing pads 188 absorb horizontally and vertically applied forces through the elastic deformation of the elastomeric load bearing pads 188, thereby protecting the structure 11 from damage caused by an earthquake.

As the elastomeric load bearing pads 188 deform in a horizontal and vertical direction, the cables or restraining devices 180 and 181 will be extended. The extent of the deformation of the elastomeric load bearing pads 188 will be limited by the cables or restraining devices 180 and 181.

In addition to limiting horizontal deformation of the elastomeric load bearing pads 188, the operation of the cables or restraining devices 180 and 181 also limits vertical deformation, thereby preventing uplift failure of the elastomeric load bearing pads 188. The elastomeric load bearing pads 188 are active for all movements of the foundation 172. Thus, the elastomeric load bearing pads 188 dampen vertical vibrating motions as well as horizontal vibrating motions.

Illustrated in FIGS. 10 and 11 is an apparatus 205 interposed between a building structure 11' and its foundation 12' for supporting the building structure 11' and for limiting the effect of vibrations between the building structure 11' and its foundation 12'. The apparatus 205 (FIGS. 10 and 11) is similar in construction and operation to the apparatus 10 (FIGS. 1–4), except for the restraining means. Hence, like parts for the apparatus 205 (FIGS. 10 and 11) are identified with the same reference numerals used for the parts of the apparatus 10 (FIGS. 1–4), but with a prime suffix.

The apparatus 205 comprises restraining means 210 (FIGS. 10 and 11) in lieu of the restraining means 21 in FIGS. 1–4. The restraining means 210 comprises an upper link 211 that is secured to the upper bearing plate 15' by suitable means, such as welding. Similarly, the restraining means 210 comprises a lower link 212 that is secured to the lower bearing plate 35 by suitable means, such as welding. The restraining means 210 further comprises a well-known eyebolt 213. The closed loop of the eyebolt 213 which is preferably coated with Teflon, receives the upper link 211 for attachment thereto and the stem of the eyebolt 213 is threaded. A suitable nut 214 with a locking insert is disposed in threaded engagement with the stem of the eyebolt 213.

Axially spaced from the lower end of the threaded stem of the eyebolt 213 is a well-known eyebolt 215. The closed loop of the eyebolt 215, which is preferably coated with Teflon, receives the lower link 216 for restraining the lifting movement of the eyebolt 215. The stem of the eyebolt 215 is threaded. Disposed in threaded engagement with the stem of the eyebolt 215 is a nut 217 with a locking insert.

A hollow block 220 of the restraining means 210 is formed with an opening at the top thereof large enough to freely receive the threaded stem of the eyebolt 213, but not large enough for the nut 214 to pass through the opening at the top of the hollow block 220. Thus, the eyebolt 213 is supported by the upper link 211 and the hollow block 220 is supported by the nut 214. Suitable openings, not shown, are formed in the side walls of the hollow block 220 for the insertion of the nut 214 into the hollow block 220 and for the threading of the nut 214 on the threaded stem of the eyebolt 213.

In a similar manner, the hollow block 220 is formed with a suitable opening at the bottom thereof, which is large enough to freely receive the threaded stem of the eyebolt 215, but not large enough for the nut 217 to pass through the opening at the bottom of the hollow block 220. Thus, the eyebolt 215 seats on the lower support plate 35'. The movement of the hollow block 220 away from the lower support plate 35' in the axial direction of the eyebolts 213 and 215 is limited to the engagement of the nut 217 with the bottom of the hollow block 220 (FIG. 11).

The openings, not shown, formed in the side walls of the hollow block 220 enable the nut 217 to be inserted into the hollow block 220 and enable the nut 217 to be threaded on the threaded stem of the eyebolt 215.

The restraining means 210 limits the displacement between the structure 11' and its foundation 12' (FIG. 11). The extent of the displacement permitted between the structure 11' and its foundation 12' is controlled by the location of the nut 217 on the threaded stem of the eyebolt 215 and the stop engagement between the nut 217 and the bottom of the hollow block 220.

For disassembling the restraining means 210, the locking inserts of the nuts 214 and 217 are broken. The nut 214 is removed from the threaded stem of the eyebolt 213 and the nut 217 is removed from the threaded stem of the eyebolt 215. For maintaining the restraining means 210 free of foreign matter, a suitable enclosure 225, such as a rubber or suitable elastomer sleeve or shield surrounds the restraining means 210.

What is claimed is:

1. Means for limiting vibrational effects between a structure having an underside and its foundation, comprising:
    (a) a plurality of first apparatuses, each of said first apparatuses having a first load bearing elastomeric element disposed between the underside of said structure and said foundation, said first load bearing elastomeric elements absorbing vertically and horizontally applied forces; and
    (b) a plurality of second apparatuses, each of said second apparatuses having a second load bearing elastomeric low friction damping element sandwiched between the underside of said structure and said foundation, said second load bearing elastomeric elements absorbing forces which cause sliding motion between the structure and the foundation.

2. Means as claimed in claim 1 wherein each of said first apparatuses comprises restraining means for limiting horizontal and vertical displacement between said structure and said foundation, said restraining means having a lower end connected to said foundation and an upper end connected to said structure.

3. Means as claimed in claim 2 wherein each of said second apparatuses comprises restraining means for limiting sliding movement between said structure and said foundation, said restraining means having a lower end connected to said foundation and an upper end connected to said structure.

4. Means as claimed in claim 3 wherein said first apparatuses are aligned in rows and wherein said second apparatuses are aligned in rows.

5. Means as claimed in claim 4 wherein said rows of first apparatuses are outboard of said rows of second apparatuses.

6. Apparatus for limiting vibrational effects between a structure having an underside and its foundation comprising:
    (a) an upper load bearing plate member affixed to the underside of said structure;
    (b) a lower load bearing plate member affixed to the foundation;
    (c) a force absorbent elastomeric load bearing element disposed between said upper plate member and said lower plate member for absorbing horizontally and vertically applied forces and for accommodating sliding movement between said upper and lower load bearing plates; and
    (d) restraining means for limiting horizontal, vertical and sliding displacement of said elastomeric load bearing element, said restraining means having an upper end connected to said upper bearing plate member and a lower end connected to said lower bearing plate member,
    (e) said elastomeric load bearing element having a central opening therethrough, said restraining means being located within said central opening.

7. Apparatus as claimed in claim 6 wherein said elastomeric load bearing element and said upper and lower load bearing plates form a housing for enclosing said restraining means.

8. Apparatus as claimed in claim 6 for limiting vibrational effects between a structure having an underside and its foundation wherein said elastomeric load bearing element comprises a plurality of layer of elastomeric force absorbent material and a plurality of plates interposed respectively between successive layer of force absorbent material for absorbing horizontal and vertical forces.

9. Apparatus as claimed in claim 6 for limiting vibrational effects between a structure having an underside and its foundation, said apparatus further comprising an elastomeric pad disposed between said elastomeric load bearing element and said upper load bearing plate member to enable sliding motion between said upper load bearing plate member and said lower load bearing plate member.

10. Apparatus for limiting vibrational effects between a structure with an underside and its foundation comprising:
    (a) a member attached to the underside of said structure having a chamber and an opening therethrough communicating with said chamber;
    (b) a first elastomeric load bearing pad having an opening therethrough disposed between said member and said foundation, said first elastomeric load bearing pad being deformable in a horizontal direction to absorb horizontally applied forces;
    (c) flexible cable restraining means having a lower end and an upper end, said flexible cable restraining means being connected to said foundation at the lower end thereof and passing at the upper end thereof through the openings in said first elastomeric load bearing pad and said member to enter said chamber of said member, said flexible cable restraining means being movable in a horizontal direction in response to the deformation of said first elastomeric load bearing pad in the horizontal direction;

(d) a stop disposed within the chamber of said member and connected to said restraining means at the upper end thereof to engage said member to limit the displacement of said first elastomeric load bearing pad in the horizontal direction caused by vibrations; and (e) a second elastomeric load bearing pad disposed between said member and said structure for accommodating sliding movement between said structure and said foundation.

11. Apparatus according to claim 10 wherein said member has a hollow configuration in which said stop is disposed.

12. Apparatus according to claim 10 and comprising a rigid load bearing plate fixed to the underside of said structure and attached to said member.

13. Apparatus according to claim 12 and comprising a rigid load bearing plate disposed between said first elastomeric load bearing pad and said foundation in fixed relation to said elastomeric load bearing pad and said foundation.

14. Apparatus for accommodating a sliding movement between a structure and its foundation comprising:

(a) an upper load bearing plate fixed to the underside of said structure;

(b) lower load bearing plate means fixed to the topside of said foundation;

(c) an elastomeric low friction damping load bearing pad sandwiched between said upper load bearing plate and said lower load bearing plate means for absorbing forces which cause a sliding movement between said structure and said foundation; and (d) restraining means connected to said upper load bearing plate and said lower load bearing plate means for limiting the sliding movement between said structure and said foundation.

15. Apparatus as claimed in claim 14 wherein said restraining means comprises a first cable attached to said upper load bearing plate and said lower load bearing plate means on one side thereof, and a second cable attached to said upper load bearing plate and said lower load bearing plate means on the opposite side thereof.

16. Apparatus as claimed in claim 14 and comprising enclosure means surrounding said restraining means to reduce the exposure of said restraining means to foreign matter.

17. Apparatus as claimed in claim 15 and comprising enclosure means surrounding said first and second cables to reduce the exposure of said first and second cables to foreign matter.

18. Apparatus for accommodating sliding movement between a structure with an underside and its foundation comprising:

(a) a member attached to the underside of said structure having a chamber and an opening therethrough communicating with said chamber;

(b) a support block having an opening therethrough disposed between said member and said foundation;

(c) an elastomeric load bearing pad disposed between said member and said structure for accommodating sliding movement between said structure and said foundation;

(d) flexible cable restraining means having a lower end and an upper end, said flexible cable restraining means being connected to said foundation at the lower end thereof and passing at the upper end thereof through the openings in said support block and said member to enter said chamber of said member, said flexible cable restraining means being movable in a horizontal direction in response to the deformation of said elastomeric load bearing pad during sliding movement; and (e) a stop disposed within the chamber of said member and connected to said restraining means at the upper end thereof to engage said member to limit the displacement of said elastomeric load bearing pad during sliding movement.

19. Apparatus according to claim 18 wherein said member has a hollow configuration in which said stop is disposed.

20. Apparatus according to claim 18 and comprising a rigid load bearing plate fixed to the underside of said structure and attached to said member.

21. Apparatus according to claim 20 and comprising a rigid load bearing plate disposed between said support block and said foundation in fixed relation to said elastomeric load bearing pad and said foundation.

22. Apparatus for limiting vibrational effects between a structure having an underside and its foundation comprising:

(a) an upper load bearing plate member affixed to the underside of said structure;

(b) a lower load bearing plate member affixed to the foundation;

(c) a force absorbent elastomeric load bearing element disposed between said upper plate member and said lower plate member for absorbing horizontally and vertically applied forces and for accommodating sliding movement between said upper and lower load bearing plates; and (d) restraining means for limiting horizontal, vertical and sliding displacement of said elastomeric load bearing element, said restraining means having an upper end connected to said upper bearing plate member and a lower end connected to said lower bearing plate member, said restraining means being located outboard of said elastomeric load bearing element.

23. Apparatus for limiting vibrational effects between a structure having an underside and its foundation comprising:

(a) an upper load bearing plate member affixed to the underside of said structure;

(b) a lower load bearing plate member affixed to the foundation;

(c) a force absorbent elastomeric load bearing element disposed between said upper plate member and said lower plate member for absorbing horizontally and vertically applied forces and for accommodating sliding movement between said upper and lower load bearing plates; and (d) restraining means for limiting horizontal, vertical and sliding displacement of said elastomeric load bearing element, said restraining means having an upper end connected to said upper bearing plate member and a lower end connected to said lower bearing plate member, said restraining means further comprising:

(a) an upper threaded member attached to said upper end of said restraining means;

(b) a lower threaded member attached to said lower end of said restraining member and seats on said lower load bearing plate to be supported thereby;

(c) an upper nut disposed in threaded engagement with said upper threaded member;

(d) a lower nut disposed in threaded engagement with said lower threaded member; and (e) a hollow block in which is disposed said upper nut and said lower nut, the upper end of said hollow block seats on said upper nut to be supported thereby, said lower nut being engaged by the lower end of said hollow block to limit the displacement between said underside of said structure and its foundation.

24. Apparatus according to claim 23 in which said elastomeric load bearing element has a central opening therethrough, said restraining means being located within said central opening.

25. Apparatus as claimed in claim 24 wherein said elastomeric load bearing element and said upper and lower load bearing plates form a housing for enclosing said restraining means.

26. Apparatus as claimed in claim 23 and comprising enclosure means surrounding said upper threaded member, said lower threaded member, said upper nut, said lower nut and said hollow block to reduce the exposure of said restraining means to foreign matter.

27. Apparatus for limiting vibrational effects between a structure having an underside and its foundation comprising:

(a) an enclosure; and (b) a first elastomeric load bearing pad disposed within said enclosure, said first elastomeric load bearing pad comprising a plurality of layers of elastomeric material and a plurality of plates interposed respectively between successive layers of elastomeric material for absorbing horizontal and vertical forces; and (c) restraining means disposed outboard of said load bearing pad for limiting horizontal and vertical displacement between said structure and said foundation, (e) said enclosure surrounding said restraining means to reduce the exposure of said restraining means to foreign matter.

* * * * *